(12) United States Patent
Francis

(10) Patent No.: US 9,114,546 B1
(45) Date of Patent: Aug. 25, 2015

(54) POWER TOOL CUTTING GUIDE ASSEMBLY

(76) Inventor: Walter R. Francis, Oshawa, CA (US)

( * ) Notice: Subject to any disclaimer, the term of this patent is extended or adjusted under 35 U.S.C. 154(b) by 414 days.

(21) Appl. No.: 13/547,262

(22) Filed: Jul. 12, 2012

(51) Int. Cl.
B27B 9/04 (2006.01)

(52) U.S. Cl.
CPC .......................... B27B 9/04 (2013.01)

(58) Field of Classification Search
CPC ............................... G01B 2003/1089
USPC .............. 83/745; 33/726, 760, 755, 640–641, 33/484, 770; 30/372–373
See application file for complete search history.

(56) References Cited

U.S. PATENT DOCUMENTS

| | | | |
|---|---|---|---|
| 2,747,625 A | 5/1956 | Small | |
| 4,111,088 A | 9/1978 | Ziegelmeyer | |
| 4,202,233 A * | 5/1980 | Larson | 83/745 |
| 4,462,898 A * | 7/1984 | Parlman et al. | 209/166 |
| 4,483,071 A * | 11/1984 | te Kolste | 30/376 |
| 4,557,170 A * | 12/1985 | Ingham | 83/468 |
| D296,528 S | 7/1988 | Down | |
| 5,197,365 A | 3/1993 | Clifton | |
| 5,390,425 A * | 2/1995 | Gilberts | 33/764 |
| 5,406,711 A * | 4/1995 | Graham | 33/42 |
| 5,481,810 A * | 1/1996 | Hastings et al. | 33/484 |
| 6,226,885 B1 * | 5/2001 | Korich | 33/760 |
| 6,553,684 B2 * | 4/2003 | Jenkins et al. | 33/770 |
| 6,673,754 B1 * | 1/2004 | Nabeshima et al. | 508/507 |
| 6,757,981 B2 * | 7/2004 | Hampton | 30/372 |
| 7,165,338 B2 | 1/2007 | Clifton | |
| 7,228,644 B1 * | 6/2007 | Hellem et al. | 33/760 |
| 7,603,935 B2 | 10/2009 | Howe | |
| 8,020,613 B2 * | 9/2011 | Nakakubo | 165/272 |
| 2006/0196072 A1 * | 9/2006 | Lewis et al. | 33/760 |

* cited by examiner

Primary Examiner — Ned Landrum
Assistant Examiner — Fernando Ayala

(57) ABSTRACT

A cutting guide assembly facilitates straight and circular cuts using a power cutting tool. The assembly includes a saddle and a tape measure coupled to the saddle. The tape measure has a tape extendable from the saddle. A tab is coupled to and extends from a distal end of the tape. A guide member is coupled to the saddle and has a guide flange alignable with a proximal end of the tape relative to the saddle. Thus, a distance between the distal end of the tape and the guide flange of the guide member is measured by the measuring tape. A tool attachment is coupled to a cutting tool. A slot is positioned in the tool attachment and aligned with a cutting blade of the cutting tool. The slot receives the tab.

11 Claims, 9 Drawing Sheets

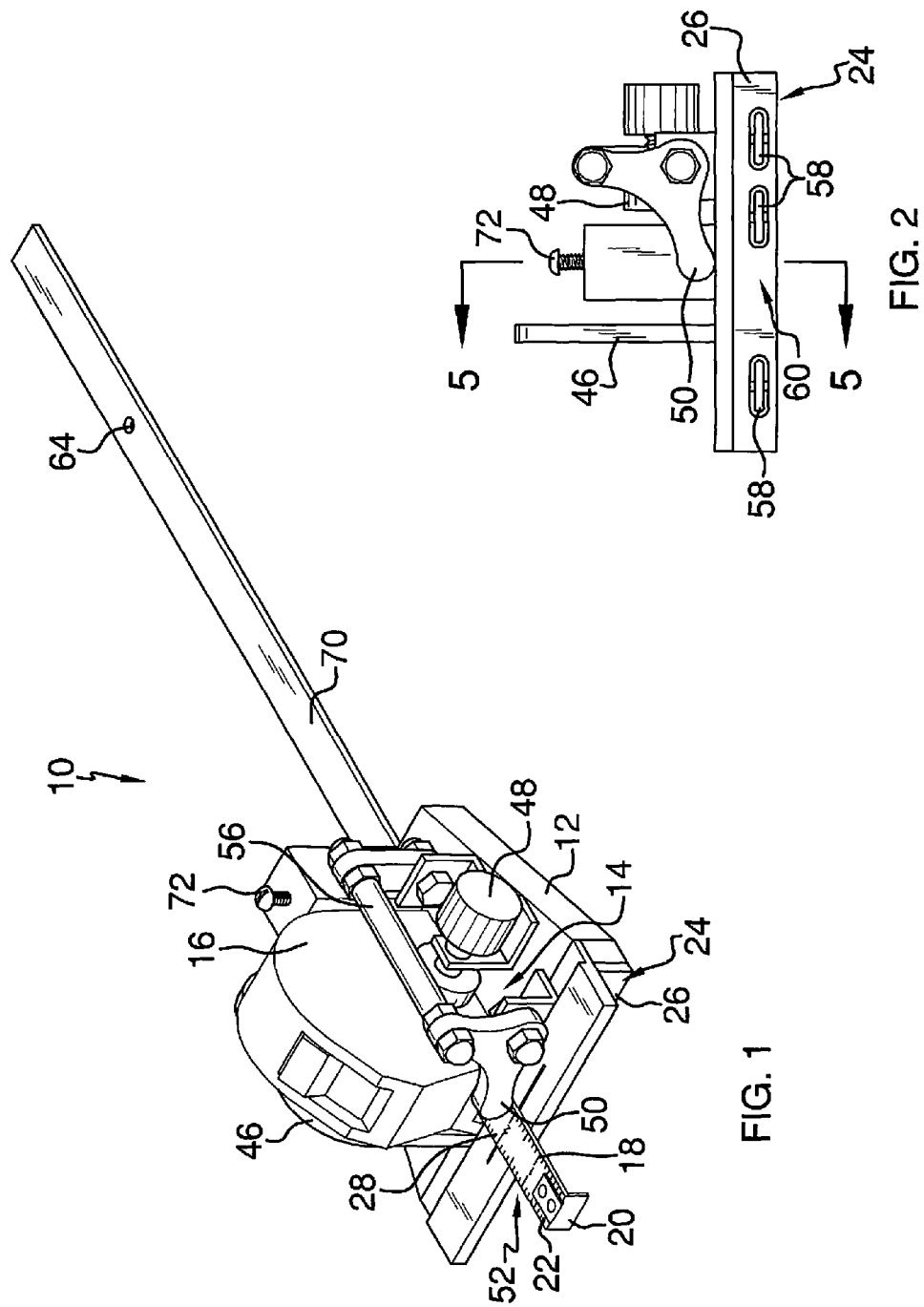

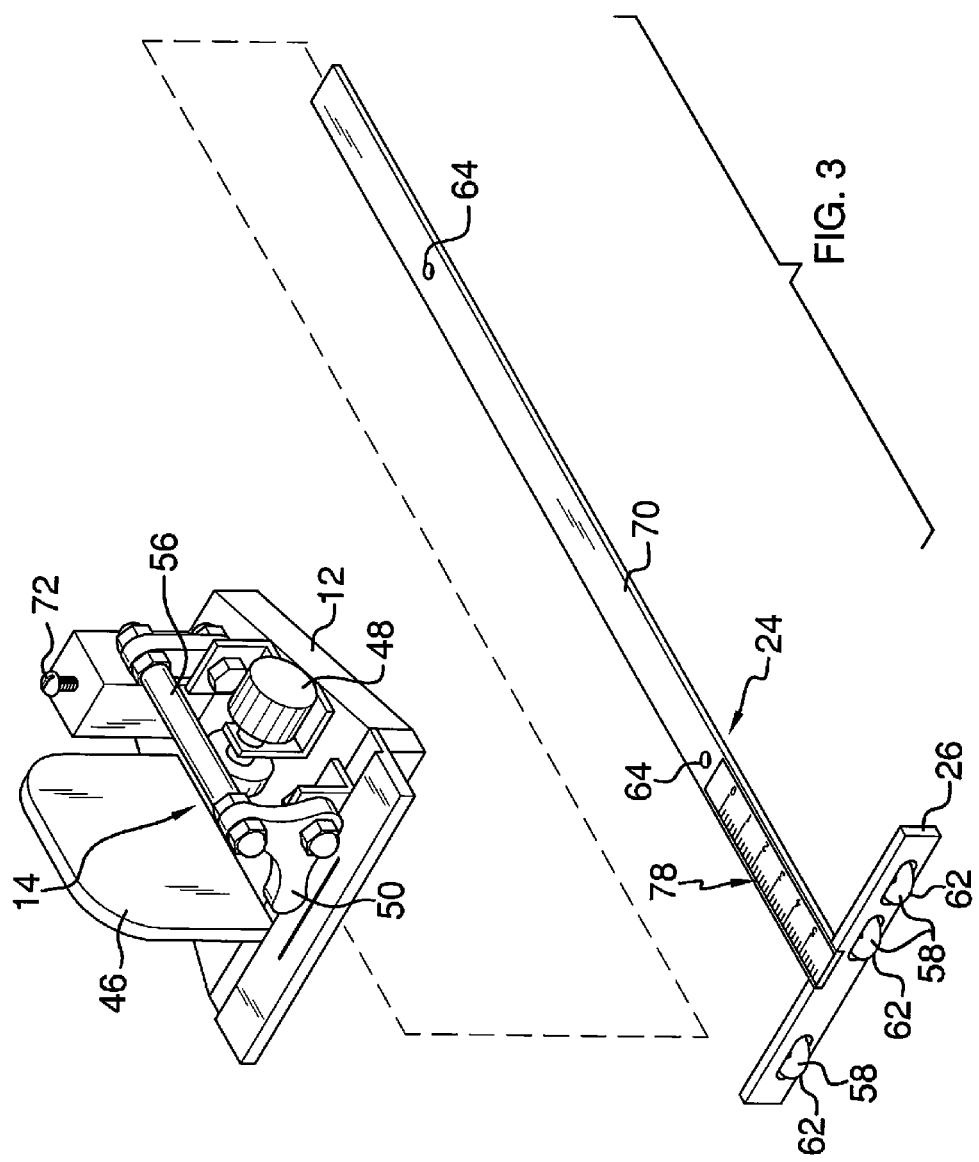

POWER TOOL CUTTING GUIDE ASSEMBLY

BACKGROUND OF THE DISCLOSURE

Field of the Disclosure

The disclosure relates to tool guide devices and more particularly pertains to a new tool guide device for facilitating straight and circular cuts using a power cutting tool.

SUMMARY OF THE DISCLOSURE

An embodiment of the disclosure meets the needs presented above by generally comprising a saddle and a tape measure coupled to the saddle. The tape measure has a tape extendable from the saddle. A tab is coupled to and extends from a distal end of the tape. A guide member is coupled to the saddle and has a guide flange alignable with a proximal end of the tape relative to the saddle. Thus, a distance between the distal end of the tape and the guide flange of the guide member is measured by the measuring tape. A tool attachment is coupled to a cutting tool. A slot is positioned in the tool attachment and aligned with a cutting blade of the cutting tool. The slot receives the tab.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a cutting guide assembly according to an embodiment of the disclosure.

FIG. 2 is a front view of an embodiment of the disclosure.

FIG. 3 is a partially exploded top front side perspective view of an embodiment of the disclosure.

DESCRIPTION OF THE PREFERRED EMBODIMENT

Figure 4:
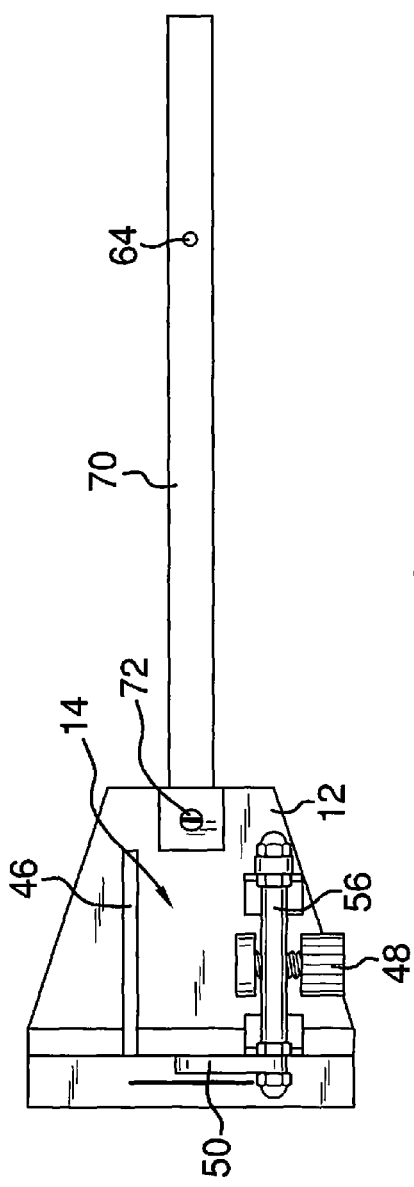
FIG. 4 is a top view of an embodiment of the disclosure.
Figure 5:
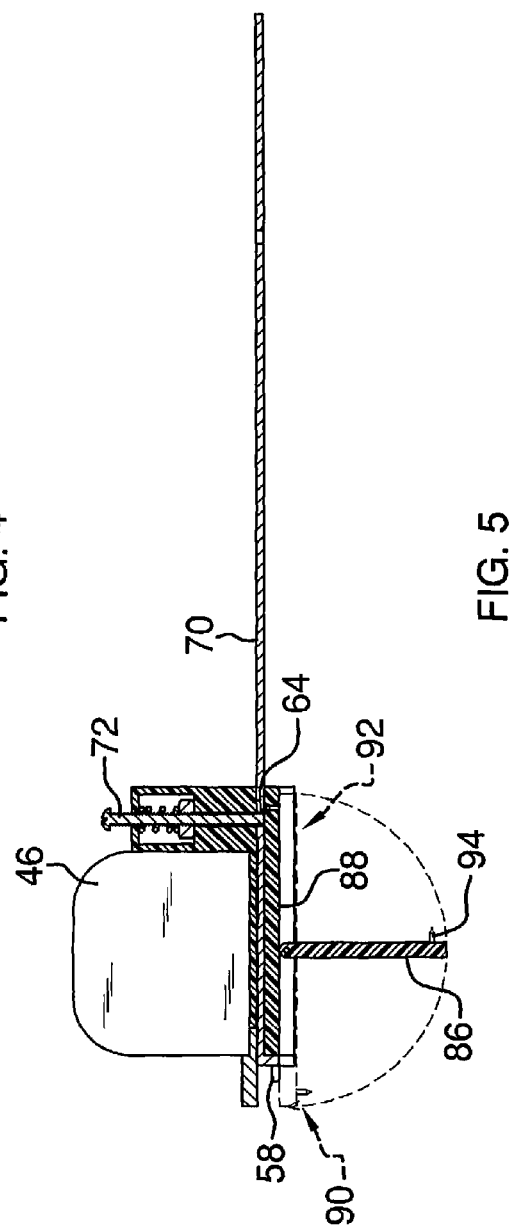
FIG. 5 is a cross-sectional view of an embodiment of the disclosure taken along line 5-5 of FIG. 2.
Figure 6:
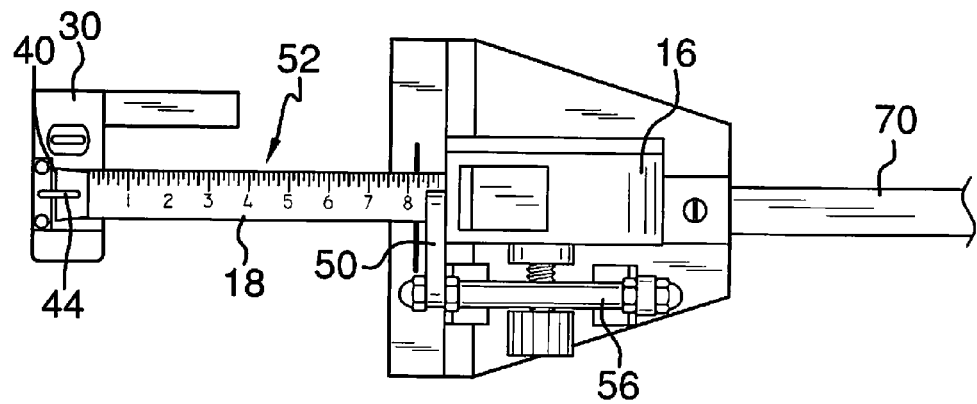
FIG. 6 is a top view of an embodiment of the disclosure.
Figure 7:
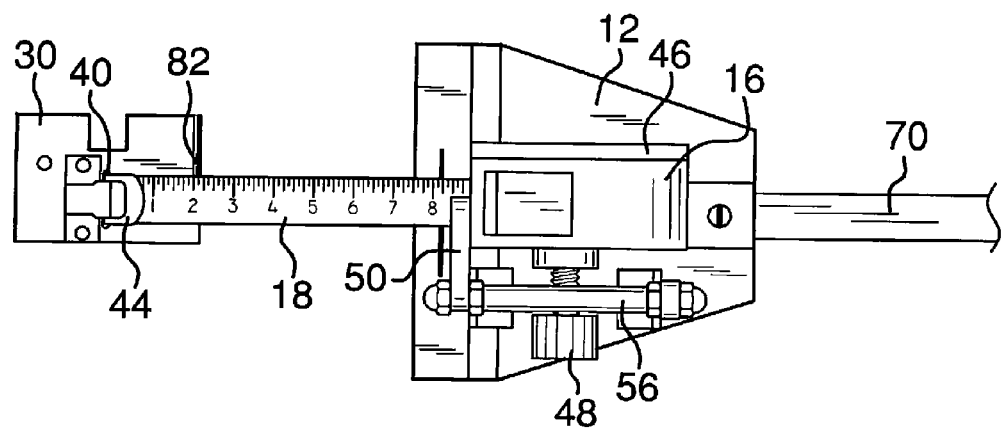
FIG. 7 is a top view of an embodiment of the disclosure.
Figure 8:
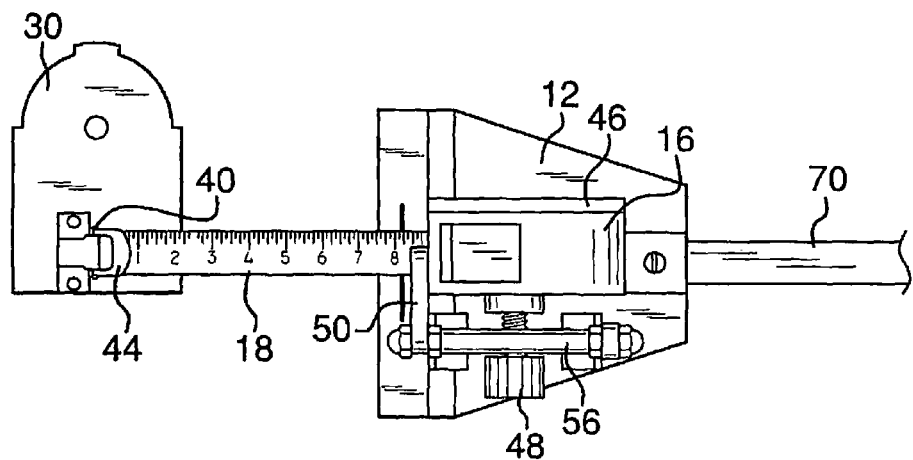
FIG. 8 is a top view of an embodiment of the disclosure.
Figure 9:
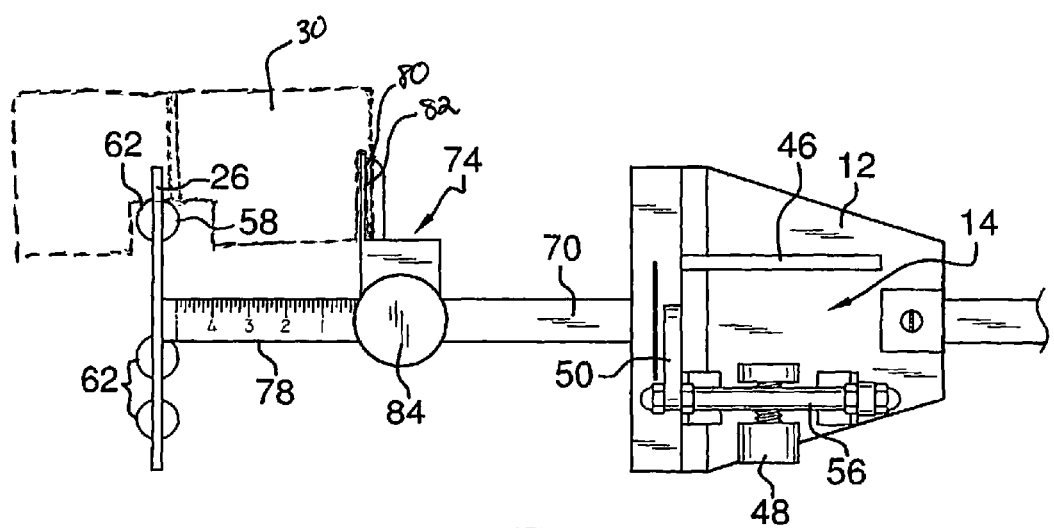
FIG. 9 is a top view of an embodiment of the disclosure.
Figure 10:
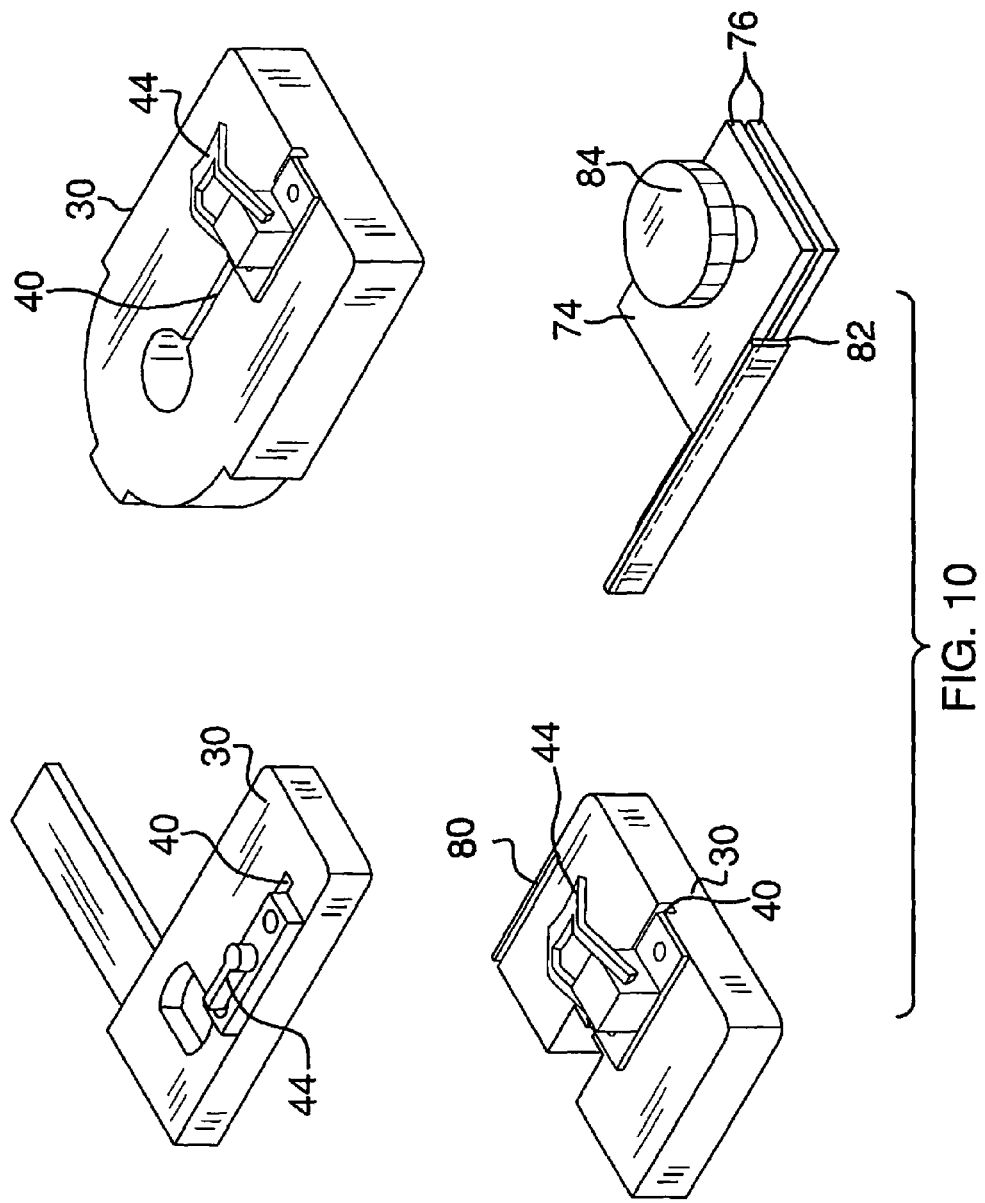
FIG. 10 is a top front side perspective view of tool attachments according to embodiments of the disclosure.
Figure 11:
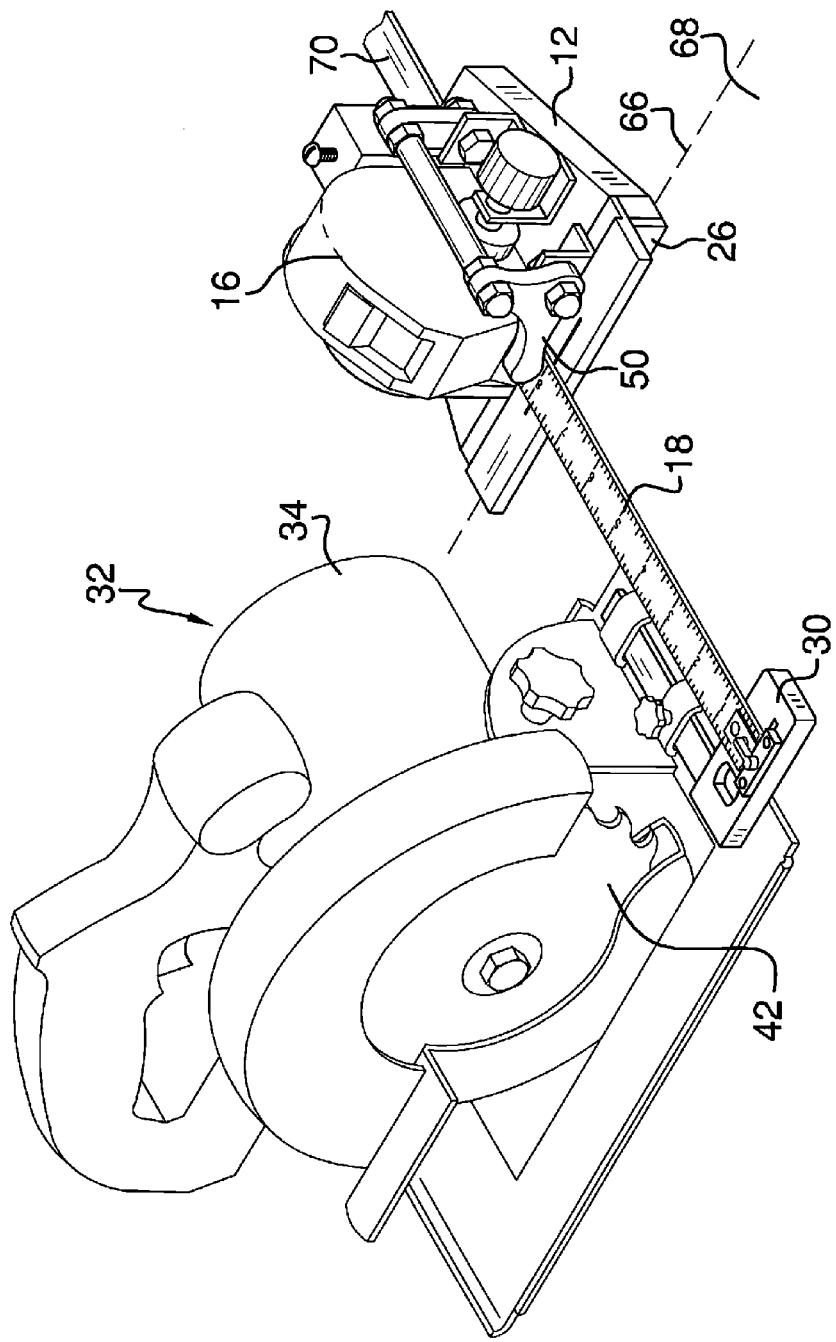
FIG. 11 is a top front side perspective view of an embodiment of the disclosure in use with a circular saw.
Figure 12:
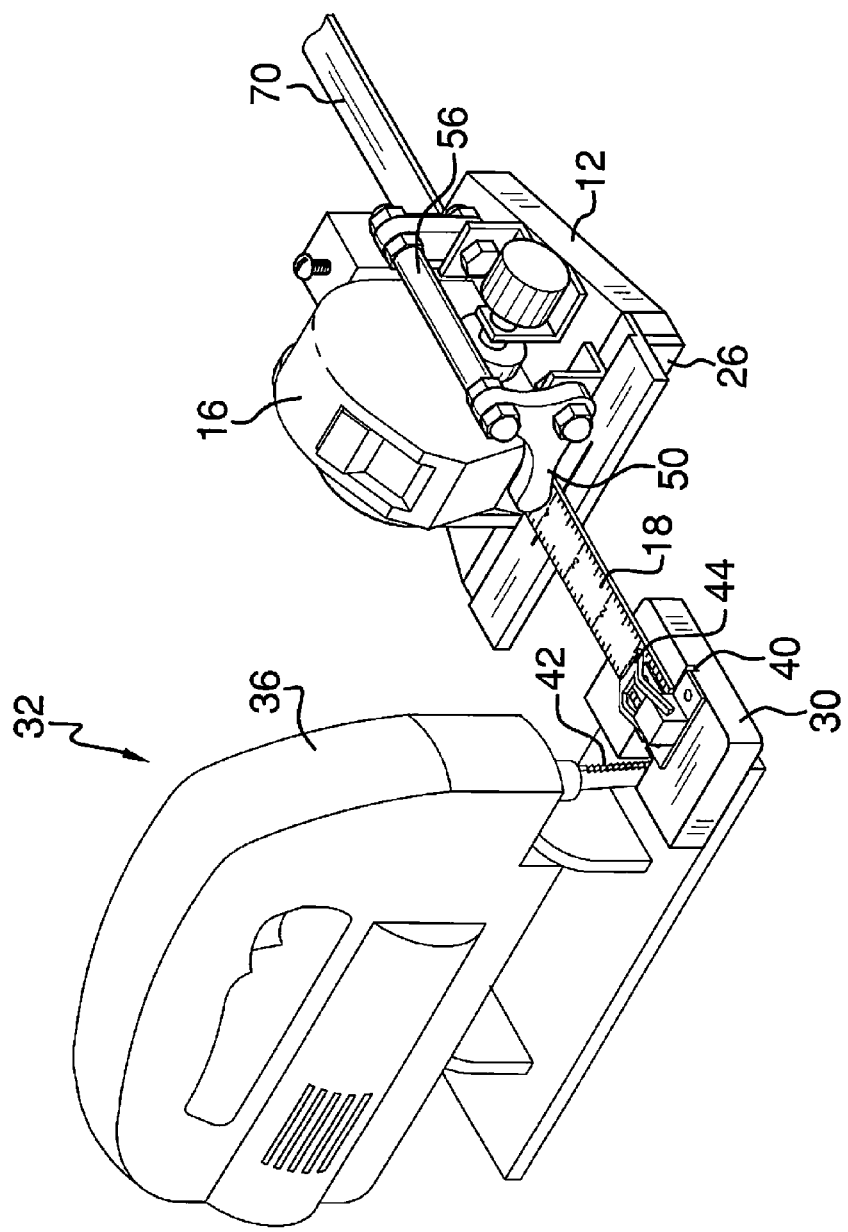
FIG. 12 is a top front side perspective view of an embodiment of the disclosure in use with a jig saw.
Figure 13:
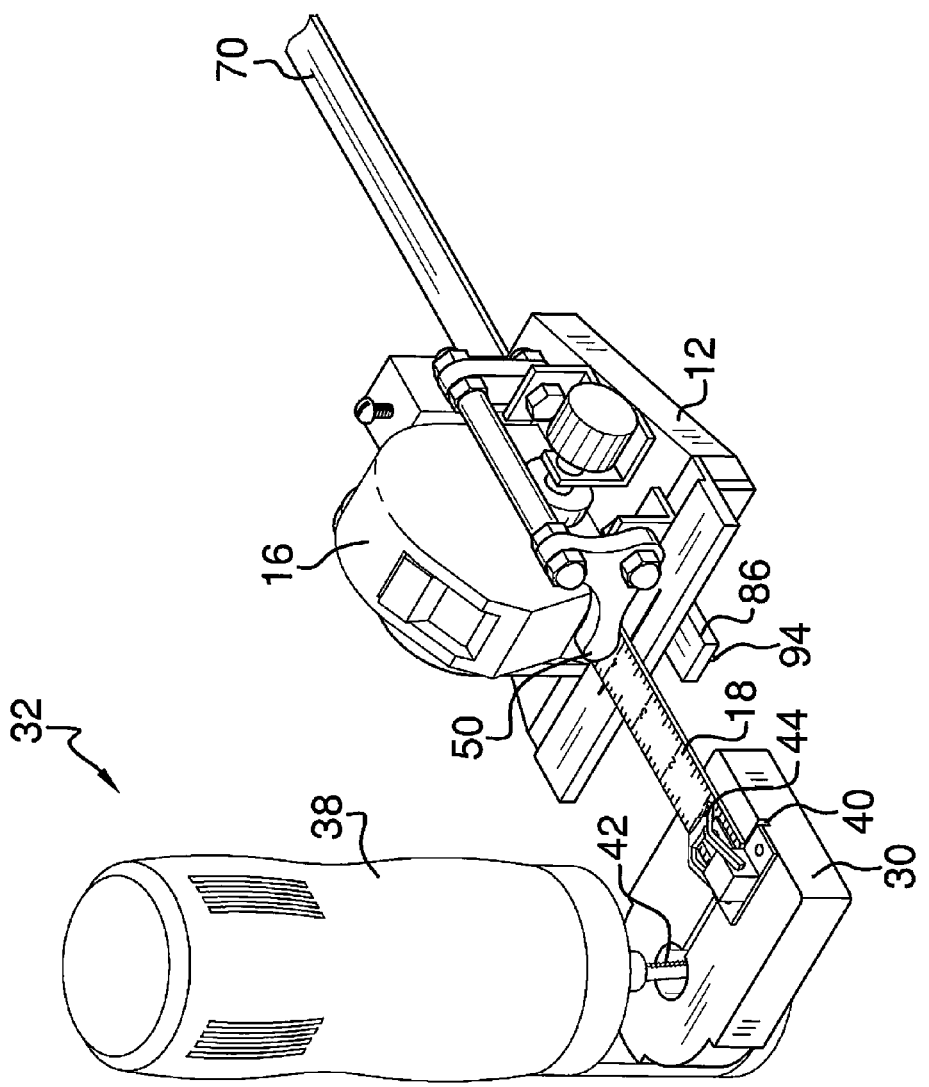
FIG. 13 is a top front side perspective view of an embodiment of the disclosure in use with a spin saw.

With reference now to the drawings, and in particular to FIGS. 1 through 13 thereof, a new tool guide device embodying the principles and concepts of an embodiment of the disclosure and generally designated by the reference numeral 10 will be described.

As best illustrated in FIGS. 1 through 13, the cutting guide assembly 10 generally comprises a saddle 12 having a seat 14. A tape measure 16 is coupled to the saddle 12 and positioned in the seat 14. The tape measure 16 has a tape 18 extendable from the saddle 12. A tab 20 is coupled to and extends from a distal end 22 of the tape 18. A guide member 24 is coupled to the saddle 12. The guide member 24 has a guide flange 26 alignable with a proximal end 28 of the tape 18 relative to the saddle 12 when the guide member 24 is in a fully retracted position relative to the saddle 12. Thus, a distance between the distal end 22 of the tape 18 and the guide flange 26 of the guide member 24 is measured by the measuring tape 16. A tool attachment 30 is configured for being coupled to a cutting tool 32 such as a circular saw 34, a jig saw 36, or a spin saw 38. A slot 40 is positioned in the tool attachment 30. The slot 40 is aligned with a cutting blade 42 of the selected cutting tool 32. The slot 40 receives the tab 20 whereby the guide flange 26 will now be spaced from the cutting blade 42 equal to a distance measured by the tape 18. A securing arm 44 may be coupled to the tool attachment 30 adjacent to the slot 40. The securing arm 44 is positionable to hold the tab 20 at the distal end 22 of the tape 18 in the slot 40. The securing arm 44 may pivot from two opposite ends to clamp the distal end 22 of the tape 18 or may pivot from a single end of the securing arm 44.

The seat 14 is defined by a wall 46 positioned adjacent to the seat 14. A tape locking member 48 is coupled to the saddle 12. The tape locking member 48 is extendable towards the wall 46 to clamp the tape measure 16 between the tape locking member 48 and the wall 46. Thus, the tape measure 16 is coupled to the saddle 12.

A locking arm 50 is pivotally coupled to the saddle 12. The locking arm 50 selectively engages the tape 18 extended from the tape measure 16 whereby the tape 18 is secured in an extended position 52. The locking arm 50 may also be aligned with the guide flange 26 to engage the tape 18 at a desired measurement to provide verification of a desired measurement. A lock arm handle 56 may be coupled to and extend from the locking arm 50. The lock arm handle 56 facilitates pivoting of the locking arm 50 into engagement with the tape 18 of the tape measure 16. The lock arm handle 56 may be positioned in opposition to the wall 46 to facilitate manipulation of the lock arm handle by anchoring a hand on the wall 46 as the lock arm handle 56 is manipulated.

A plurality of wheels 58 may be coupled to the guide flange 26. The wheels extend along a straight edge 60 of the guide flange 26. An outer diameter surface 62 of each of the wheels 58 is coplanar and aligned with the tape 18 to provide accurate measurement from the tab 20. Thus, the wheels 58 facilitate sliding of the guide flange 26 along an edge 66 of a piece 68 being cut.

The guide member 24 is also selectively extendable from the saddle 12 such that the straight edge 60 of the guide flange 26 is positioned in spaced relationship to the saddle 12. A plurality of spaced apertures 64 extend through a connection flange 70 of the guide member 24. A spring-loaded locking pin 72 may be coupled to the saddle 12 to be selectively insertable into a selected one of the apertures 64 in the connection flange 70 such that the guide member 24 is secured in a static position relative to the saddle 12 with the guide flange 26 in spaced relationship to the saddle 12. This is done to facilitate cutting for shorter measurements where the saddle 12 would contact the structure of the cutting tool 32 to prevent positioning of the guide flange 26 against the edge 66. A guide jig 74 may be coupled to the connection flange 70 of the guide member 24 extending between the guide flange 26 and the saddle 12. The guide jig 74 has a pair of spaced planar projections 76 and the tape 18 is positionable between the spaced projections 76. Spaced measurement indicia 78 is positioned on the connection flange 70 of the guide member 24. A groove 80 is positioned in the tool attachment 30 and a tongue 82 is positioned on the guide jig 74. The tongue 82 is received in the groove 80 whereby the straight edge 60 of the guide flange 26 or the outer surface 62 of the wheels 58 is positioned in spaced relationship to the cutting blade 42 by a measurement indicated by the indicia 78 on the connection flange 70. A set screw 84 may be coupled to the spaced projections 76 for clamping the tape 18 between the projections 76 when the set screw 84 is tightened.

To make circular or curved cuts, a base plate 86 is pivotally coupled to a bottom 88 of the saddle 12. The base plate 86 is pivotable between an open position 90 and a closed position 92. A pin 94 is coupled to and extends from the base plate 86. The pin 94 extends outwardly from the saddle 12 when the base plate 86 is in the open position 90. The pin 94 is aligned with the proximal end 28 of the tape 18 of the tape measure 16 when the base plate 86 is in the open position 90. Thus, the saddle 12 may pivot on the pin 94 and the tape 18 will measure a radius of the cut being made.

In use, the tool attachment 30 is coupled to the cutting tool 32 and the tape measure 16 is coupled to the saddle 12. The tape 18 is extended to a desired length and secured by a conventional mechanism on the tape measure 16 and/or by manipulation of the locking arm 50. The tab 20 is inserted into the slot 40 and secured. The guide flange 26 now provides the desired distance between the guide member 24 and the cutting blade 42. The cutting tool 32 is used as the guide member 24 is moved across the edge 66 to make the measured cut desired. For shorter widths, the guide jig 74 is used. For curved or circular cuts, the base plate 86 is pivoted to the open position 90 and the spin saw 38 may be used.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cutting guide assembly comprising:
   a saddle;
   a tape measure coupled to said saddle, said tape measure having a tape extendable from said saddle;
   a tab coupled to and extending from a distal end of said tape relative to said saddle;
   a guide member coupled to said saddle, said guide member having a guide flange alignable with a proximal end of said tape relative to said saddle whereby a distance between said distal end of said tape and said guide flange of said guide member is measured by said measuring tape;
   a tool attachment, said tool attachment being configured for coupling to a cutting tool;
   a slot positioned in said tool attachment, said slot being aligned with a cutting blade of the cutting tool, said slot receiving said tab;
   said guide member being extendable from said saddle such that a straight edge of said guide flange is positioned in spaced relationship to said saddle;
   a guide jig, said guide jig being couplable to a connection flange of said guide member extending between said guide flange and said saddle;
   spaced measurement indicia being positioned on said connection flange of said guide member;
   a groove being positioned in said tool attachment; and
   a tongue being positioned on said guide jig, said tongue being received in said groove whereby said straight edge of said guide flange is positioned in spaced relationship to the cutting blade by a measurement indicated by said indicia on said connection flange.

2. The assembly of claim 1, further including a securing arm coupled to said tool attachment adjacent to said slot, said securing arm being positionable to hold said distal end of said tape in said slot.

3. The assembly of claim 1, further comprising:
   said saddle having a seat receiving said tape measure;
   a wall positioned adjacent to said seat; and
   a tape locking member coupled to said saddle, said tape locking member being extendable towards said wall to clamp said tape measure between said tape locking member and said wall whereby said tape measure is coupled to said saddle.

4. The assembly of claim 1, further including a locking arm coupled to said saddle, said locking arm selectively engaging said tape extended from said tape measure whereby said tape is secured in an extended position.

5. The assembly of claim 4, further including a lock arm handle coupled to and extending from said locking arm, said lock arm handle facilitating pivoting of said locking arm into engagement with said tape of said tape measure.

6. The assembly of claim 1, further including a plurality of wheels coupled to said guide flange, said wheels extending along a straight edge of said guide flange, said wheels facilitating sliding of said guide flange along an edge of a piece being cut.

7. The assembly of claim 1, further comprising:
   said guide jig having a pair of spaced planar projections, said tape being positionable between said spaced projections; and
   a set screw coupled to said spaced projections, said set screw clamping said tape between said projections when said set screw is tightened.

8. The assembly of claim 1, further comprising:
   a plurality of spaced apertures extending through a connection flange of said guide member; and
   a locking pin coupled to said saddle, said locking pin being selectively insertable into a selected one of said apertures in said connection flange whereby said guide member is secured in a static position relative to said saddle.

9. The assembly of claim 8, further including said locking pin being spring-loaded.

10. The assembly of claim 1, further comprising:
    a base plate pivotally coupled to a bottom of said saddle, said base plate being pivotable between an open position and a closed position; and
    a pin coupled to and extending from said base plate, said pin extending outwardly from said saddle when said base plate is in said open position, said pin being aligned with a proximal end of said tape of said tape measure when said base plate is in said open position.

11. A cutting guide assembly comprising:
- a saddle, said saddle having a seat;
- a tape measure coupled to said saddle and positioned in said seat, said tape measure having a tape extendable from said saddle;
- a tab coupled to and extending from a distal end of said tape relative to said saddle;
- a guide member coupled to said saddle, said guide member having a guide flange alignable with a proximal end of said tape relative to said saddle whereby a distance between said distal end of said tape and said guide flange of said guide member is measured by said measuring tape, said guide member being selectively extendable from said saddle such that a straight edge of said guide flange is positioned in spaced relationship to said saddle;
- a tool attachment, said tool attachment being configured for coupling to a cutting tool;
- a slot positioned in said tool attachment, said slot being aligned with a cutting blade of the cutting tool, said slot receiving said tab;
- a securing arm coupled to said tool attachment adjacent to said slot, said securing arm being positionable to hold said distal end of said tape in said slot;
- a wall positioned adjacent to said seat;
- a tape locking member coupled to said saddle, said tape locking member being extendable towards said wall to clamp said tape measure between said tape locking member and said wall whereby said tape measure is coupled to said saddle;
- a locking arm coupled to said saddle, said locking arm selectively engaging said tape extended from said tape measure whereby said tape is secured in an extended position;
- a lock arm handle coupled to and extending from said locking arm, said lock arm handle facilitating pivoting of said locking arm into engagement with said tape of said tape measure;
- a plurality of wheels coupled to said guide flange, said wheels extending along a straight edge of said guide flange, said wheels facilitating sliding of said guide flange along an edge of a piece being cut;
- a guide jig, said guide jig being couplable to a connection flange of said guide member extending between said guide flange and said saddle, said guide jig having a pair of spaced planar projections, said tape being positionable between said spaced projections;
- spaced measurement indicia being positioned on said connection flange of said guide member;
- a groove being positioned in said tool attachment;
- a tongue being positioned on said guide jig, said tongue being received in said groove whereby said straight edge of said guide flange is positioned in spaced relationship to the cutting blade by a measurement indicated by said indicia on said connection flange;
- a set screw coupled to said spaced projections, said set screw clamping said tape between said projections when said set screw is tightened;
- a plurality of spaced apertures extending through said connection flange of said guide member;
- a spring-loaded locking pin coupled to said saddle, said locking pin being selectively insertable into a selected one of said apertures in said connection flange whereby said guide member is secured in a static position relative to said saddle;
- a base plate pivotally coupled to a bottom of said saddle, said base plate being pivotable between an open position and a closed position; and
- a pin coupled to and extending from said base plate, said pin extending outwardly from said saddle when said base plate is in said open position, said pin being aligned with a proximal end of said tape of said tape measure when said base plate is in said open position.

* * * * *